(12) United States Patent  
Egedal et al.

(10) Patent No.: US 10,240,586 B2  
(45) Date of Patent: Mar. 26, 2019

(54) OPERATING A WIND TURBINE OF A WIND FARM

(71) Applicant: Siemens Aktiengesellschaft, München (DE)

(72) Inventors: Per Egedal, Herning (DK); Anders Eriksen, Herning (DK)

(73) Assignee: SIEMENS AKTIENGESELLSCHAFT (DE)

( * ) Notice: Subject to any disclaimer, the term of this patent is extended or adjusted under 35 U.S.C. 154(b) by 8 days.

(21) Appl. No.: 15/364,584

(22) Filed: Nov. 30, 2016

(65) Prior Publication Data

US 2017/0234301 A1 Aug. 17, 2017

(30) Foreign Application Priority Data

Jan. 29, 2016 (EP) ..................................... 16153397

(51) Int. Cl.  
*F03D 7/04* (2006.01)  
*G05B 19/042* (2006.01)  
(Continued)

(52) U.S. Cl.  
CPC ........... *F03D 7/048* (2013.01); *G05B 19/042* (2013.01); *H02J 3/18* (2013.01); *H02J 3/386* (2013.01); *F03D 7/047* (2013.01); *F03D 9/255* (2017.02); *F05B 2270/1033* (2013.01); *F05B 2270/335* (2013.01); *F05B 2270/703* (2013.01);  
(Continued)

(58) Field of Classification Search  
CPC ................................ F03D 7/048; F03D 7/0047  
See application file for complete search history.

(56) References Cited

U.S. PATENT DOCUMENTS 7,983,799 B2 * 7/2011 Bose .......................... H02J 3/06  
700/287  
9,318,988 B2 4/2016 Larsen et al.  
(Continued)

FOREIGN PATENT DOCUMENTS

CN 103580069 A 2/2014  
CN 103676832 A 3/2014  
(Continued)

OTHER PUBLICATIONS

European Search Report for Application No. 1615397.1, dated Jul. 29, 2016.  
(Continued)

*Primary Examiner* — Vincent H Tran  
(74) *Attorney, Agent, or Firm* — Schmeiser, Olsen & Watts, LLP

(57) ABSTRACT

A method is proposed for operating at least one wind turbine of a wind farm including determining wind turbine individual offset information based on reactive power provided by the respective wind turbine and reactive power provided by at least one further wind turbine of the wind farm, determining wind turbine individual control information based on the wind turbine individual offset information and wind farm specific control information, operating the at least one wind turbine according to the wind turbine individual control information. Further, a controller and a device as well as a computer program product and a computer readable medium are also provided.

12 Claims, 3 Drawing Sheets

(51) Int. Cl.
*H02J 3/18* (2006.01)
*H02J 3/38* (2006.01)
*F03D 9/25* (2016.01)

(52) U.S. Cl.
CPC ..... *G05B 2219/2619* (2013.01); *Y02E 10/723* (2013.01); *Y02E 10/763* (2013.01); *Y02E 40/30* (2013.01)

(56) References Cited

U.S. PATENT DOCUMENTS

| | | | |
|---|---|---|---|
| 2008/0150283 A1* | 6/2008 | Rivas | H02J 3/1885 290/44 |
| 2011/0156389 A1* | 6/2011 | Arlaban Gabeiras | H02J 3/1885 290/44 |
| 2012/0101643 A1 | 4/2012 | Kirchner et al. | |
| 2014/0035284 A1 | 2/2014 | Bech | |
| 2014/0159367 A1 | 6/2014 | Yin | |
| 2015/0061289 A1* | 3/2015 | Larsen | F03D 7/00 290/44 |
| 2015/0337808 A1* | 11/2015 | Kang | F03D 7/048 290/44 |
| 2016/0268940 A1* | 9/2016 | Achilles | H02J 3/1842 |
| 2017/0025859 A1* | 1/2017 | Garcia | H02J 3/16 |
| 2017/0338652 A1* | 11/2017 | Ubben | H02J 3/18 |

FOREIGN PATENT DOCUMENTS

| | | |
|---|---|---|
| CN | 104426155 A | 3/2015 |
| EP | 1933441 A1 | 6/2008 |
| EP | 2711543 A1 | 3/2014 |

OTHER PUBLICATIONS

Non-english Chinese Office Action dated Aug. 16, 2018 for Application No. 201710057039.0.

* cited by examiner

OPERATING A WIND TURBINE OF A WIND FARM

CROSS-REFERENCE TO RELATED APPLICATIONS

This application claims priority to European application No. EP 16153397.1 having a filing date of Jan. 29, 2016, the entire contents of which are hereby incorporated by reference.

FIELD OF TECHNOLOGY

The following relates to a method, a controller and to a device for operating at least one wind turbine of a wind farm. In addition, an according computer program product and a computer readable medium are suggested.

BACKGROUND

One goal of a wind farm controller is to control centrally an active and reactive power injected by a whole wind farm (also referred to as "wind park") into a grid. This provides the possibility to participate actively in control tasks on the grid for the wind farms in the same way as conventional power plants do. Thereby, a wind farm control level behaves as a single centralized unit ("central wind farm control level") which has as input, e.g., system operator orders, measurements from a power common coupling ("PCC") and available powers from the wind turbines of the wind farm and as outputs elaborated reference information or signals for each individual wind turbine, i.e. each individual wind turbine control ("local wind turbine control level").

Active power control functions of the wind farm controller may comprise, e.g., an automatic frequency control wherein the frequency measured in the wind farm point of common coupling (PCC) is controlled. The wind farm must thus be able to produce more or less active power in order to compensate for a deviant behavior in the frequency.

Reactive power control functions of the wind farm controller may comprise, e.g., an automatic voltage control wherein the voltage in the wind farm point of common coupling (PCC) is controlled. This implies that the wind farm can be ordered to produce or absorb an amount of reactive power to the grid in order to compensate for the deviations in the voltage in the grid.

One reason for placing automatic frequency control in the wind farm control level is to avoid that the wind farm controller can counteract the frequency control implemented in the individual wind turbine. Automatic voltage control is placed in the wind farm control level in order to avoid a risk of instability and a high flow of reactive power between the wind turbines. Usually, the implementation of both frequency and voltage control is going to be done as a combined droop and dead band control.

The central wind farm control level may comprise two separated control loops, one for the active power control and the other for the reactive power control.

One possible implementation of the active and reactive control loop may be as follows:

First, an active and reactive power reference signal, respectively, are derived in a control function block, based on one or several control functions required by the system operator. These reference signals may be, if necessary, adjusted further with some corrections from subordinated control loops (e.g. focusing on frequency and voltage) respectively, in order to assure that the frequency and voltage limits in the PCC are not violated. Each loop consists of a PI controller ensuring a correct power production from the wind farm. The controller computes a power error and sets up the power reference for the whole wind farm. These power references are further converted into power reference signals for each individual wind turbine of the wind farm.

Controlling reactive power in a wind farm may be based on, e.g., a common voltage reference provided to the wind turbines.

When controlling reactive power in a wind farm using such a common voltage reference, the individual wind turbines may produce/consume different amounts of reactive power, depending on their location in the wind farm, measurement tolerances and other factors like, e.g., converter control strategy. This unbalance may lead to a loss of energy in the wind farm and unnecessary wear on components shorting their operational lifetime.

One possible solution for controlling reactive power within a wind farm may be based on distributing a reactive power reference to the wind turbines instead of a voltage reference. This solution may reduce the performance of responses to power grid events and the response times to changes in grid voltage in wind farms under voltage control.

SUMMARY

An aspect relates to optimizing the controlling of reactive power in a wind farm.

In order to overcome this problem, a method is provided for operating at least one wind turbine of a wind farm, comprising the following steps,
  determining wind turbine individual offset information based on
    reactive power provided by the respective wind turbine and
    reactive power provided by at least one further wind turbine of the wind farm,
  determining wind turbine individual control information based on
    the wind turbine individual offset information and
    wind farm specific control information,
  operating the at least one wind turbine according to the wind turbine individual control information.

Wind turbine individual control information may be a power reference or a power reference signal representing the power reference or a value thereof provided to an individual wind turbine for controlling reactive power production of the wind turbine according to the proposed solution.

The wind turbine individual control information may be a voltage reference signal generated by a central wind farm controller.

Wind farm specific control information may be control information like, e.g., active and reactive power control information provided e.g. by a system operator controlling operation of the wind farm.

Wind turbine individual offset information may be information determined based on wind turbine individual and/or wind farm specific information and may be used as a correction/offset factor being applied to the wind farm specific control information.

Operating several wind turbines of a wind farm individually according to the proposed solution allows a leveling of, e.g., reactive power among several individual wind turbines of the wind farm compensating for, e.g., different converter types, measurement principles and tolerances. As an advantage, a lifetime of the wind turbines may be lengthened as well as losses in the wind farm due to high reactive currents being exchanged within the wind farm may be limited.

In an embodiment, the wind turbine individual offset information is determined
 based on the reactive power provided by the wind turbine and
 based on a mean value of reactive power provided by the wind turbine and
 the at least one further wind turbine of the wind farm.

In another embodiment, the wind turbine individual offset information is determined based on a deviation information representing a deviation or difference between the reactive power provided by the wind turbine and the mean value of reactive power.

According to an exemplary embodiment, the difference may be derived by subtracting the reactive power provided by the wind turbine from the mean value of reactive power.

In a further embodiment, the deviation information is processed based on at least one out of the following functionalities:
 applying a gain factor,
 applying an integration,
 applying a limiting factor.

In a next embodiment, the mean value of reactive power is weighted by a value of a wind turbine individual weight factor. Thereby, the weighting may be implemented by multiplication.

It is also an embodiment that a wind turbine individual reactive power offset is added to the reactive power provided by the wind turbine. Alternatively other information processing operations may be allied like, e.g., subtraction or multiplication.

Pursuant to another embodiment, the wind turbine individual control information is determined by adding
 the wind turbine individual offset information and
 the wind farm specific control information.

According to an embodiment, the wind turbine individual control information is representing a wind turbine individual voltage reference controlling the reactive power to be provided by the respective wind turbine.

The problem stated above is also solved by a controller for operating at least one wind turbine of a wind farm, comprising a processing unit that is arranged for
 determining wind turbine individual offset information based on
  reactive power provided by the respective wind turbine and
  reactive power provided by at least one further wind turbine of the wind farm,
 determining wind turbine individual control information based on
  the wind turbine individual offset information and
  wind farm specific control information,
 operating the at least one wind turbine according to the wind turbine individual control information.

According to an exemplary embodiment, the controller may be part of or may be implemented in a wind farm controller.

The problem stated above is also solved by a device comprising and/or being associated with a processing unit and/or hard-wired circuit and/or a logic device that is arranged such that the method as described herein is executable thereon.

Said processing unit may comprise at least one of the following: a processor, a microcontroller, a hard-wired circuit, an ASIC, an FPGA, a logic device.

The solution provided herein further comprises a computer program product directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

BRIEF DESCRIPTION

Some of the embodiments will be described in detail, with reference to the following figures, wherein like designations denote like members, wherein.

DETAILED DESCRIPTION

Figure 1:
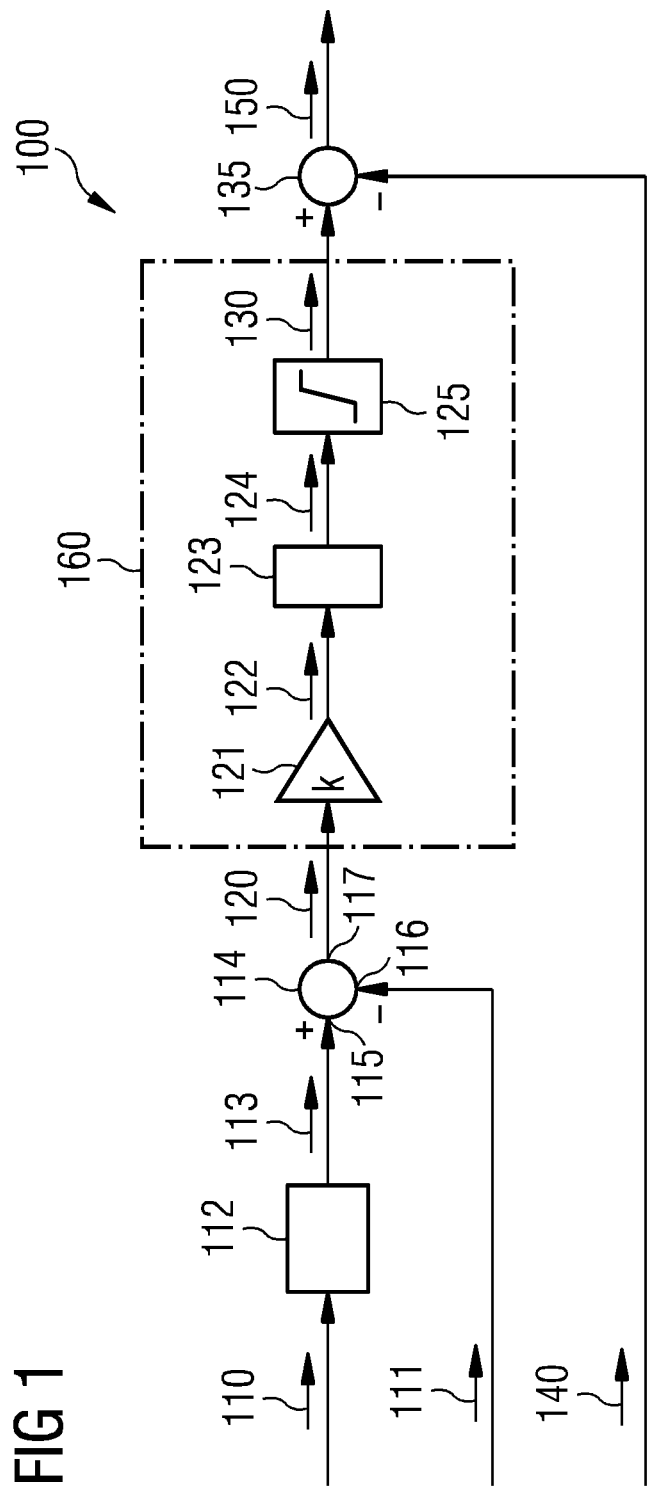
FIG. 1 shows an exemplary embodiment of a control scheme for balancing reactive power between several wind turbines of a wind farm.

FIG. 1 shows an exemplary control scheme 100 for balancing reactive power between several wind turbines of a wind farm. The control scheme 100 of FIG. 1 may be part of a wind farm controller individually controlling operation of N wind turbines of the wind farm.

According to the exemplary embodiment of FIG. 1 information 111 representing reactive power Q[n] provided by an individual wind turbine (here the "n-th" wind turbine of the N available wind turbines of the wind farm) is passed to a negative input 116 of an adding element 114. Further, information 110 representing reactive power individually provided by each of the N wind turbines Q[1 . . . N] is forwarded to an input of a calculation element 112 determining a mean value of reactive power based on the information 110. A resulting information 113 representing the mean value of reactive power is forwarded to an adding input 115 of the adding element 114 calculating a difference or deviation between the mean value 113 and the value 111 of individual reactive power Q[n] provided by the n-th wind turbine.

A deviation information 120 provided at an output 117 of the adding element 114 representing a resulting value of the calculation is provided to an input of a processing unit 160 exemplarily comprising an amplifier 121, an integrator 123 and a limiter 125.

According to the exemplary control scheme of FIG. 1 the information 120 is forwarded to an input of the amplifier 121 applying, e.g., a gain factor k to the information 120. Resulting information 122 available at an output of the amplifier 121 is provided to an input of the integrator 123 processing an integration based on the provided information 122. Resulting information 124 at the output of the integrator 123 may be forwarded to limiter 125 generating limited voltage information based on the information 124 wherein resulting wind turbine individual offset information 130 is passed to a first positive input of an adding element 135.

Further, common voltage reference information 140 controlling in general the reactive power to be provided by the wind farm is passed to a second positive input of the adding element 135. The common voltage reference information 140 may be exemplarily provided as wind farm specific control information $U_{RefPark}$ by a system operator controlling operation of the wind farm. Resulting information 150 representing a value of the sum of the common voltage reference information 140 and the wind turbine individual offset information 130 is provided to an output of the adding element 135.

According to the exemplary control scheme of FIG. 1 the wind turbine individual control information 150 is representing a wind turbine individual voltage reference $U_R[n]$ which might be forwarded to the respective n-th wind turbine thereby controlling the reactive power Q[n] to be provided by that n-th wind turbine based on the control information 150.

The wind turbine individual voltage reference $U_R[n]$ 150 may be provided to a local wind turbine control level of the respective wind turbine being responsible for a proper production of wind turbine individual reactive power according to the control information 150.

Figure 2:
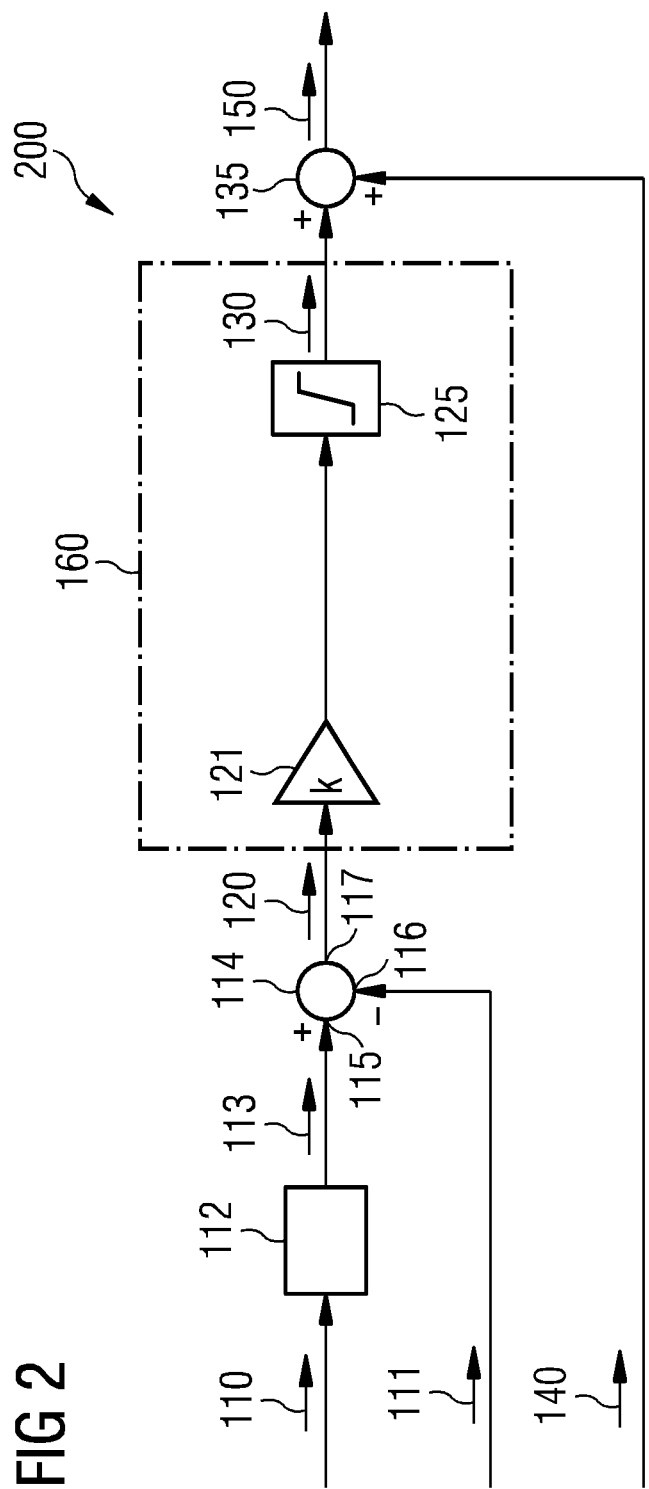
FIG. 2 shows an alternative embodiment of the proposed control scheme.

FIG. 2 shows an alternative embodiment of the proposed control scheme allowing a faster implementation of the proposed control scheme. The proposed solution 200 as visualized in FIG. 2 is mainly based on the control scheme of FIG. 1, so the same reference numbers are used and reference is made to the respective part of the description. The differing feature to the proposed solution of FIG. 1 is the missing integrator (indicated by the reference number 123 in FIG. 1) in the processing unit 160 of FIG. 2, wherein an output of the amplifier 121 is directly linked to an input of the limiter 125.

Figure 3:
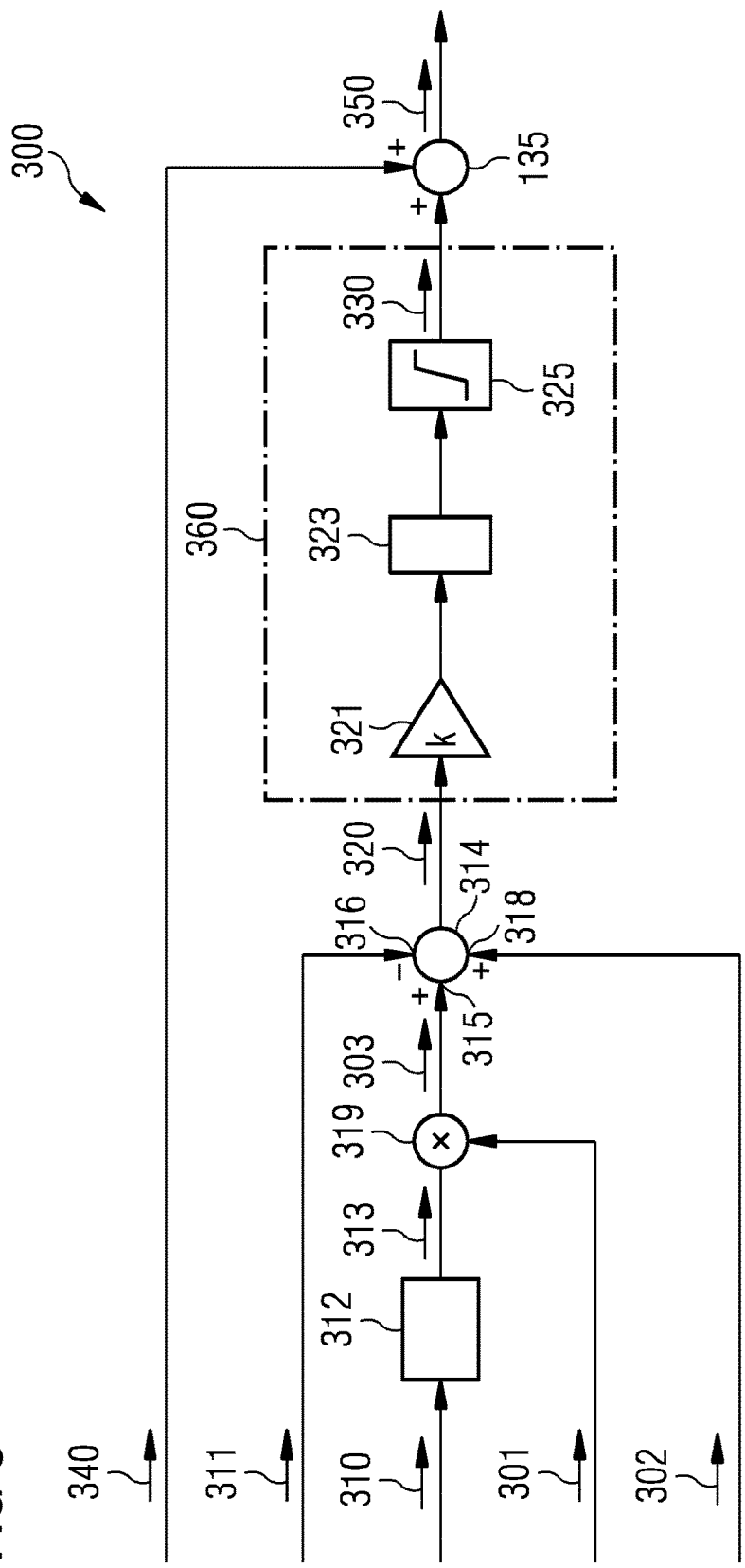
FIG. 3 shows a further alternative embodiment of the present invention.

FIG. 3 shows a further alternative embodiment 300 of the proposed solution.

Thereby, information 311 representing reactive power Q[n] provided by an individual n-th wind turbine is passed to a negative input 316 of an adding element 314. Further, information 310 representing individual reactive power provided by each of the N wind turbines Q[1 . . . N] is forwarded to a an input (or several inputs according to an alternative embodiment) of an averaging ("mean value calculating") element 312 determining a mean value of reactive power based on the information 310. Differing to the solution as shown in FIG. 1 a resulting information 313 representing the mean value of reactive power Q[1 . . . N] provided by all of the N wind turbines of the wind farm is forwarded to an input of a multiplication element 319 multiplying the mean value of reactive power 313 by a value 301 of a wind turbine individual weight factor w[n] provided to a further input of the multiplication element 319. A resulting value 303 representing a weighted mean value is routed to a further positive input 315 of the adding element 314. Differing to the embodiment of FIG. 1 a value 302 representing a wind turbine individual reactive power offset $Q_{Offset}[n]$ is provided to a further positive input 318 of the adding element 314. Based on the information 303, 302 and 311 provided to the respective inputs 315, 318, 316 a value 320 representing a sum of the provided information 303, 302, 311 is calculated by the adding element 314. The information 320 being available at an output 317 of the calculation element 314, representing the result of the calculation is provided to an input of a processing unit 360 which might have similar functionality like the processing unit 160 as shown in FIG. 1 (comprising, e.g., an amplifier 321, an integrator 323 and a voltage limiter 325), so reference is made to the respective description of FIG. 1

Similar to the scenario of FIG. 1 a resulting information 330 representing wind turbine individual offset information provided via an output of the voltage limiter 325 is passed to a first positive input of an adding element 335 wherein a common voltage reference information 340 controlling the reactive power to be provided by the wind farm is routed to a second positive input of the adding element 335. Resulting information 350 representing a value of the sum of the common voltage reference information 340 and the wind turbine individual offset information 330 is provided to an output of the adding element 335 and may be forwarded as a wind turbine individual control information $U_R[n]$ to the respective n-th wind turbine.

The control scheme 300 as exemplarily shown in FIG. 3, in particular by applying an additional value 301 of a wind turbine individual weight factor w[n] and by applying a value 302 of a wind turbine individual offset based on reactive power $Q_{Offset}[n]$ allows, e.g., a proper definition of a reactive power balancing strategy like, e.g., controlling wind turbines physically located closer to the PCC to deliver more reactive power than wind turbines having a greater distance to the PCC. Further, the control scheme 300 enables an optimization of a reactive power and voltage control within the wind farm on a Medium Voltage side of a turbine transformer.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for operating at least one wind turbine of a wind farm, comprising the following steps:
  determining wind turbine individual offset information based on:
    reactive power provided by the respective wind turbine, and
    reactive power provided by at least one further wind turbine of the wind farm;
    wherein the wind turbine individual offset is based on a deviation information that is provided to an input of a processing unit comprising an amplifier and a limiter;
  determining wind turbine individual control information based on:
  the wind turbine individual offset information and
  wind farm specific control information; and
  operating the at least one wind turbine according to the wind turbine individual control information.

2. The method according to claim 1, wherein the wind turbine individual offset information is determined
  based on the reactive power provided by the wind turbine and
  based on a mean value of reactive power provided by the wind turbine and
    the at least one further wind turbine of the wind farm.

3. The method according to claim 2, wherein the deviation information represents a deviation or difference between the reactive power provided by the wind turbine and the mean value of reactive power.

4. The method according to claim 3, wherein the deviation information is processed by the processing unit, based on at least one out of the following functionalities:
  applying a gain factor,
  applying an integration,
  applying a limiting factor.

5. The method according to claim 2, wherein the mean value of reactive power is weighted by a value of a wind turbine individual weight factor.

6. The method according to claim 2, wherein a wind turbine individual reactive power offset is added to the reactive power provided by the wind turbine.

7. The method according to claim 1, wherein the wind turbine individual control information is determined by adding the wind turbine individual offset information, and the wind farm specific control information.

8. The method according to claim 1, wherein the wind turbine individual control information is representing a wind turbine individual voltage reference controlling the reactive power to be provided by the respective wind turbine.

9. A device comprising and/or being associated with a processor unit and/or hard-wired circuit and/or a logic device that is arranged such that the method according to claim 1 is executable thereon.

10. A non-transitory computer readable medium, having computer-executable instructions adapted to cause a computer system to perform the steps of the method according to claim 1.

11. A controller for operating at least one wind turbine of a wind farm, comprising:
- a processing unit comprising an amplifier and a limiter that is arranged for:
  - determining wind turbine individual offset information based on
    - reactive power provided by the respective wind turbine, and
    - reactive power provided by at least one further wind turbine of the wind farm;
  - determining wind turbine individual control information based on:
    - the wind turbine individual offset information and wind farm specific control information; and
  - operating the at least one wind turbine according to the wind turbine individual control information.

12. A method for operating at least one wind turbine of a wind farm, comprising the following steps:
- receiving a reactive power value for the respective wind turbine and at least one further wind turbine of the wind farm;
- calculating a mean of the reactive power values for the respective wind turbine and the at least one further wind turbine of the wind farm;
- determining wind turbine individual offset information based on the reactive power value provided by the respective wind turbine and the mean of the reactive power values for the respective wind turbine and the at least one further wind turbine of the wind farm,
  - wherein the wind turbine individual offset information is based on deviation information representing a deviation or difference between the reactive power provided by the wind turbine and the mean value of reactive power values for the respective wind turbine and the at least one further wind turbine of the wind farm,
  - further wherein the deviation information is processed based on at least one of the following functionalities:
    - applying a gain factor,
    - applying an integration, and
    - applying a limiting factor;
- determining wind turbine individual control information based on the wind turbine individual offset information and wind farm specific control information; and
- operating the at least one wind turbine according to the wind turbine individual control information.

* * * * *